United States Patent [19]

Davis et al.

[11] 4,134,721
[45] Jan. 16, 1979

[54] PRECAST FURNACE PIPE INSULATION

[75] Inventors: Raymond W. Davis, Etobicoke; Paul J. J. Downey, Burlington, both of Canada

[73] Assignee: Plibrico Company Inc., Chicago, Ill.

[21] Appl. No.: 814,385

[22] Filed: Jul. 11, 1977

[51] Int. Cl.² ............................ F27D 3/02; F16L 9/14
[52] U.S. Cl. ..................................... 432/234; 138/147
[58] Field of Search ......................... 432/234; 138/147

[56] References Cited

U.S. PATENT DOCUMENTS

| 2,482,878 | 9/1949 | Schmidt | 432/234 |
| 2,693,352 | 11/1954 | Bloom | 432/234 |
| 3,149,826 | 9/1964 | Brough et al. | 432/234 |

Primary Examiner—John J. Camby
Attorney, Agent, or Firm—Fetherstonhaugh & Co.

[57] ABSTRACT

A precast reinforced insulating member and a method of manufacturing same. The reinforced insulating member is used for covering a furnace pipe or the like and comprises a body of insulating material, a plurality of reinforcing coil members and weldable lugs secured at each end of the reinforcing coil members. The body of insulating material has an arcuate shaped inner surface adapted to extend in intimate contact with the surface of a furnace tube in use and a pair of transverse side faces. The reinforcing coil members are embedded in the body and extend circumferentially thereof at longitudinally spaced intervals along the length of the body. Each of the coil members has oppositely disposed ends thereof disposed at adjacent side faces of the body. Passages open through the body between the inner and outer surfaces thereof adjacent each end of each reinforcing coil member. The weldable lugs are secured to each end of the reinforcing coil member. The method of manufacturing the precast reinforcing insulating member includes the steps of securing a pair of weldable lugs to opposite ends of a plurality of reinforcing coil members, extending the coil members about a convex arcuate section of a first component of a mould and releasably securing the weldable lugs with respect to the first component in an extended position, enclosing the coil members by means of a second mould component to form mould cavity between the first and second mould components and casting reinforcing insulating material into the mould cavity to form a body of insulating material encasing the reinforcing coil members and allowing the cast material to set and moving the precast reinforcing member from the mould.

5 Claims, 5 Drawing Figures

PRECAST FURNACE PIPE INSULATION

This invention relates to precast reinforced insulating members for use as a covering for furnace pipes and a method of manufacturing same.

Numerous attempts have been made to provide an effective furnace pipe insulation for furnaces such as the reheating furnaces used in the iron and steel industry. U.S. Pat. Nos. 3,149,802 date Sept. 22, 1964 and 3,168,297 dated Feb. 2, 1965 describe one form of pipe insulation and method of producing same. In this structure, coiled reinforcing members are secured with respect to the pipe which is to be insulated by means of tie wires which extend therethrough. By reason of the fact that tie wires are used to secure the coils, it is necessary to apply the insulating material about the furnace pipes in situ. This is a time consuming operation in which it is difficult to maintain quality control. An alternative form of insulation in which the components are precast is described in U.S. Pat. No. 3,781,167 dated Dec. 25, 1973. The disadvantage of this structure is that is is necessary to prefabricate the reinforcing metal core and this is a time consuming operation. The greater the number of V-shaped members which are used, the greater the effectiveness of the reinforcing insert. However, the greater the number of V-shaped numbers which are used, the greater the time required in order to prefabricate the reinforcement and therefore, the greater the cost of the reinforcement.

U.S. Pat. No. 2,693,352 discloses a further form of furnace insulation in which a woven wire fabric is used to form the reinforcement. This fabric has only a limited penetration into the depth of the insulating material and, consequently, has only a limited efficiency as a reinforcing material.

The present invention overcomes the difficulties of the prior art described above and provides a structure which permits reinforcing coil members to be used as a reinforcement in a precast insulating member.

SUMMARY OF THE INVENTION

According to one aspect of the present invention, there is provided a precast reinforced insulating member for use as a covering for a furnace pipe comprising, a body of insulating material having an arcuate shaped inner surface adapted to extend in intimate contact with the surface of a furnace tube in use, an outer surface, a pair of transverse side spaces extending from the inner arcuate surface to the outer surface and longitudinally of the body, and a pair of oppositely disposed end faces, a plurality of reinforcing coil members embedded in said body and extending circumferentially thereof at longitudinally spaced intervals along the length of the body, each of said coil members having oppositely disposed ends thereof disposed adjacent opposite side faces of said body, passage means opening through said body between said inner arcuate surface and said outer surface thereof adjacent each end of said reinforcing coil member, weldable lug means secured to each end of each reinforcing coil member and projecting into each passage means in a plane disposed adjacent to and substantially parallel to said inner arcuate surface whereby a substantial portion of each weldable lug means is disposed in weldable proximity to a furnace pipe and is accessible through said passage means when the insulating member is operably located about a furnace pipe in use.

According to a further aspect of the present invention, there is provided a method of manufacturing a precast reinforcing insulating member for use as a covering for a furnace pipe comprising the steps of, securing a pair of weldable lugs to opposite ends of each of a plurality of reinforcing coil members, extending said coil members about a convex arcuate section of a first component of a mould and releasably securing said weldable lugs with respect to said first component of the mould to mount said coil members in said extended position on the first component of the mould, enclosing said coil members by means of a second mould component to form a mould cavity between the first and second mould components within which said reinforcing coil members are located at longitudinally spaced intervals, casting reinforcing insulating material into the mould cavity to form a body of insulating material encasing said reinforcing coil members and conforming to the configuration of said mould cavity, allowing the cast material to set and opening the mould and releasing the weldable lugs from the first mould component and removing the precast reinforcing member therefrom.

The invention will be more clearly understood after reference to the following detailed specification read in conjunction with the drawings wherein, FIG. 1 is a pictorial view of a reinforcing coil member according to an embodiment of the present invention;

Figure 1:
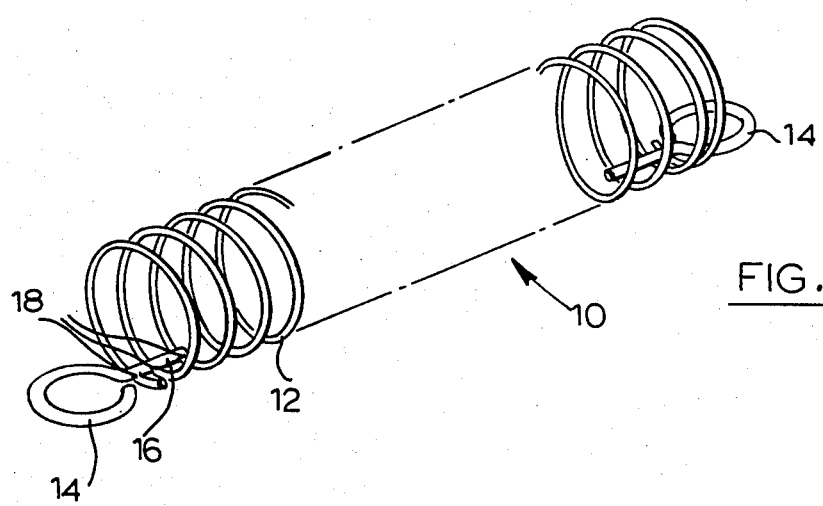

With reference to FIG. 1 of the drawings, reference numeral 10 refers generally to a reinforcing coil member according to an embodiment of the present invention. The coil member consists of a coil spring 12 and a pair of weldable lugs in the form of eye-bolt members 14. The eye-bolt members 14 each have a leg portion 16 which extends into the coil member 12 and is welded as shown at 18 to three turns of the coil. Preferably, the reinforcing coil 12 is made from stainless steel coated with BITUMASTIC. It has been found that a stainless steel coil spring type 0.109 GA 310 SS of 1" outside diameter may be used as a reinforcing element for an insulating member suitable for use in association with a furnace pipe measuring 2" in diameter or more, generally in the range of 2" to 6". Preferably, the eye-bolt members 14 are made from stainless steel and are of a thickness so as to be readily weldable to the furnace pipe. Generally, the eye-bolt will have a diameter of about twice the diameter of the turns of the coil spring. The arm portion 16 of the eye-bolt being secured to three adjacent turns of the spring serves to prevent all of the load which is transferred from the eye-bolt to the spring in use being applied to the last turn of the spring. In this respect, the use of an independent member which can be secured to more than one turn of the spring makes the reinforcement considerably stronger than would be the case if the last turn of the spring was used as a connecting piece connecting the coil spring directly to the furnace pipe. In addition, it will be noted that the eye-bolts 14 extend in a plane which is substantially parallel to the plane of the face of the coil spring which is located at the innermost arcuate face of the precast reinforced insulating members. This ensures that the eye-bolt 14 presents a substantial surface area towards the furnace pipe to which it is to be welded in use.

Figure 2:
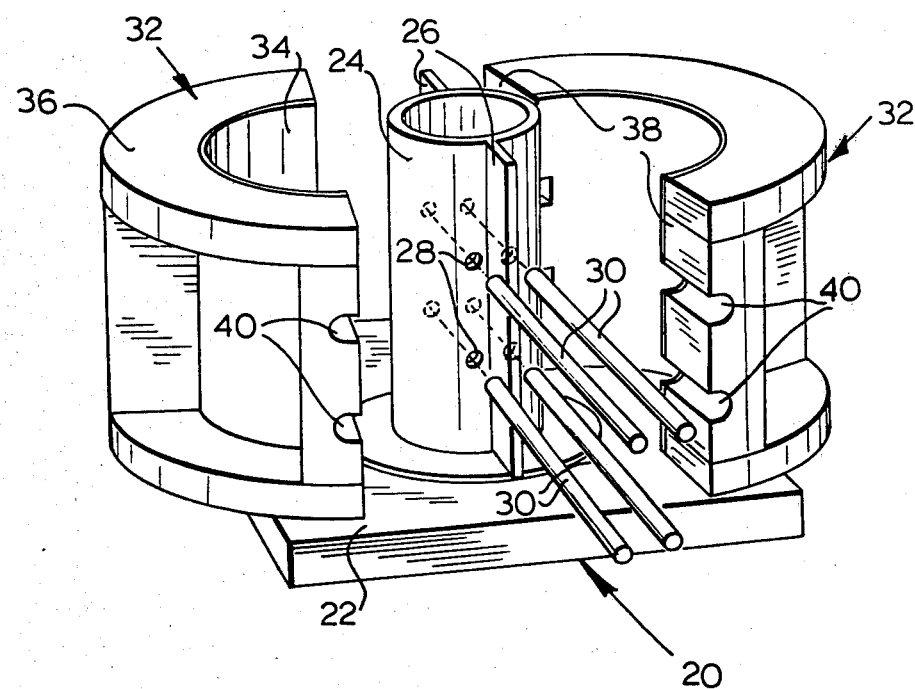
FIG. 2 is an exploded view of a mould for use in the forming of a pair of arcuate shaped reinforcing members.
Figure 3:
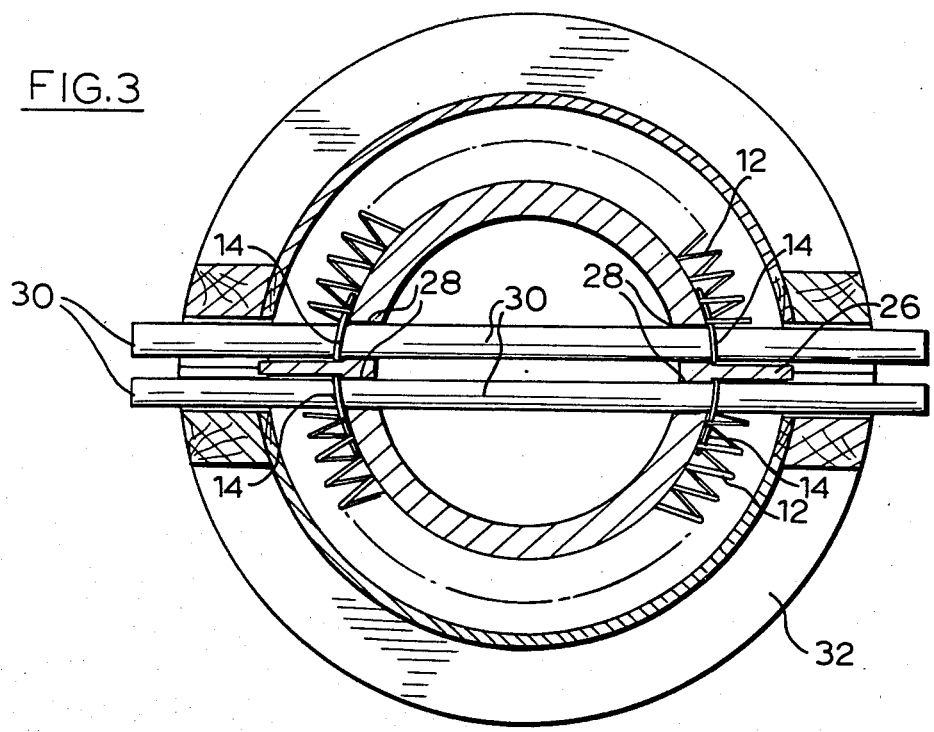
FIG. 3 is a sectional plan view of an assembled mould.

FIGS. 2 and 3 of the drawings serve to illustrate the structure of the mould in which the insulating members are formed and the method of manufacture thereof. With reference to FIG. 2 of the drawings, the reference numeral 20 refers generally to the mould in which the insulating members are formed. The mould consists of a base 22 upon which a cylindrical shaped core member 24 is mounted. A pair of rectangular shaped flange members 26 project radially outwardly from the core 24 at diagonally opposed locations on the periphery thereof. The cylindrical core member is formed with passages 28 opening therethrough to receive four elongated pins 30. The passages 28 are arranged in sets of two on either side of the flanges 26 and the pins 30 are proportioned to project through the passages 28 and to extend outwardly from the core member 24. A pair of mould members 32 are provided for use in association with the core member 24. The mould members 32 each consist of an arcuate shaped inner liner 34 and a backing support frame 36. The mould members 32 each have longitudinal side faces 38 adapted to abut one another to form a moulding cavity about the core member 24 which is divided into two distinct chambers by the radially extending flange members 26. Notches 40 are formed in the end faces of each mould section to provide clearance for the pins 30 to project outwardly therefrom in use.

To assemble the mould, one of the pins 30 is threaded through one eye-bolt 14. The pin 30 is then driven through a first passage 28 and out of its associated second passage 28. The coil spring member 12 is stretched so that the opposite eye 14 is located over the end of the pin 30 which is protruding from its associated passage 28. The pin 30 is then driven further through the passage 28 so that it projects an equal distance from opposite sides of the core member 24. This process is repeated until all of the required reinforcing coil members are located in the mould. In the embodiment illustrated in FIGS. 2 and 3 of the drawings, four reinforcing members are provided, two being located on each side of the mould. The mould members 32 are then positioned about the core 24. The mould cavity is then filled with insulating material of a type suitable for use in association with furnace pipes. A material suitable for this purpose is a high alumina castable refractory concrete such as that identified by the trade mark PLICAST and available from Plibrico (Canada) Limited. Preferably, stainless steel needles in the amount of 2% by weight are added to the refractory concrete prior to casting. The concrete is then permitted to set. After setting, the mould sections 32 may be removed. The pins 30 are then withdrawn and two sections of precast reinforced insulating material are then removed from the mould.

Figure 4:
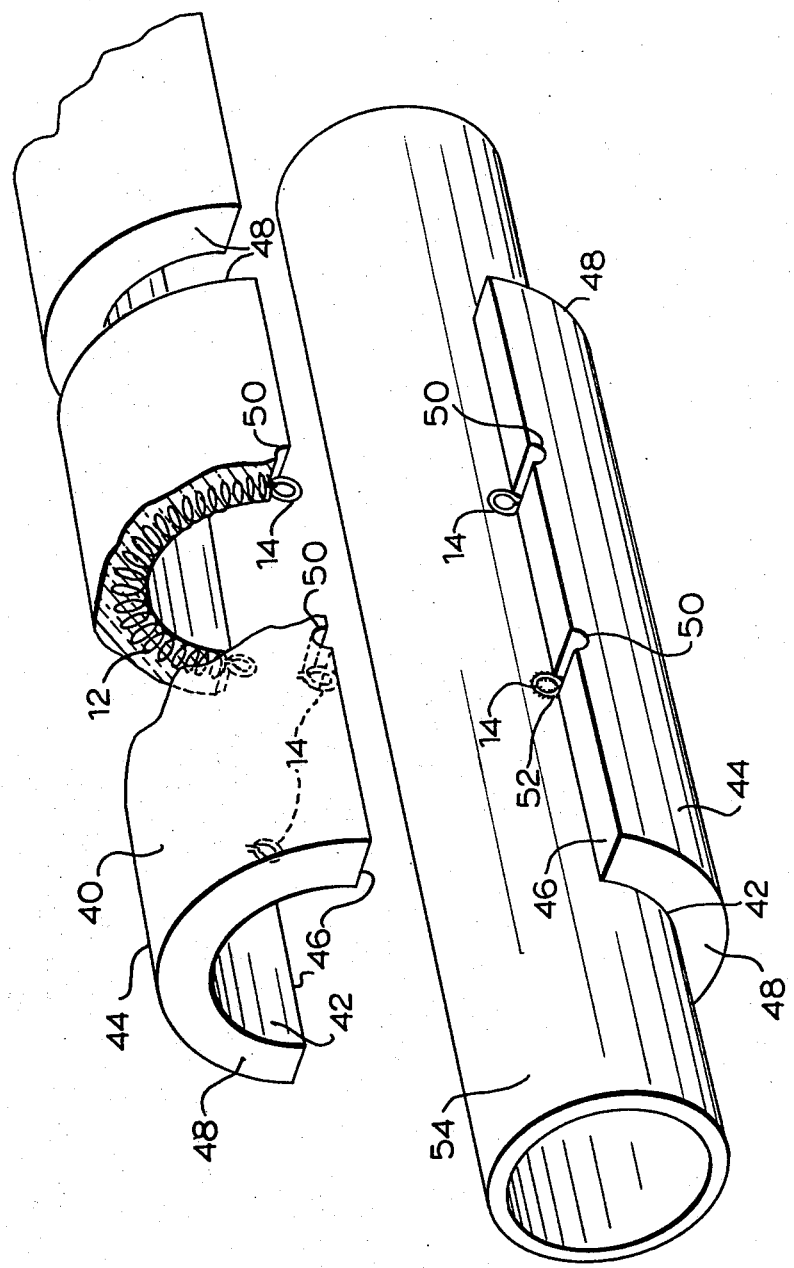
FIG. 4 is a partially sectioned pictorial view illustrating the structure of the insulating members and the manner in which they are secured with respect to the pipe.

FIG. 4 of the drawings diagrammatically illustrates two precast reinforcing insulating members 40 made in the mould illustrated in FIGS. 2 and 3 of the drawings. As shown in FIG. 4, the members 40 each have an arcuate shaped inner surface 42 and an arcuate shaped outer surface 44. The body of insulating material 40 also has a pair of transversely extending side faces 46 which extend longitudinally thereof and a pair of oppositely disposed end faces 48. Passages 50 open inwardly from the transverse surfaces 46 of the body of insulating material such that the eye members 14 of the coil springs 12 are exposed and accessible from the exterior of the body through the passages 50 to be welded, as shown at 52, to a furnace pipe 54 in use. The bars 30 which are used to secure the eye-bolt members 14 with respect to the mould during the moulding operation form the passages 50 in the moulded body of insulating material.

To install the precast reinforced insulating members on a pipe 54, they are placed about the pipe 54 as shown in FIG. 4. A plurality of precast reinforced insulating members may be mounted on the pipe 54 and temporarily secured in a position extending entirely around the pipe by an adhesive tape or the like. Preferably, when a pipe is to be completely encircled by insulating material two arcuate shaped bodies of insulating material are located about the pipe and aligned with one another as shown in FIG. 4, with the passages 50 of one body aligned with the passages 50 of the other body so that they combine to form a larger passage. The eyes 14 of the bolts are then welded to the tube 54 by passing a welding rod or the like through the passage 50.

Figure 5:
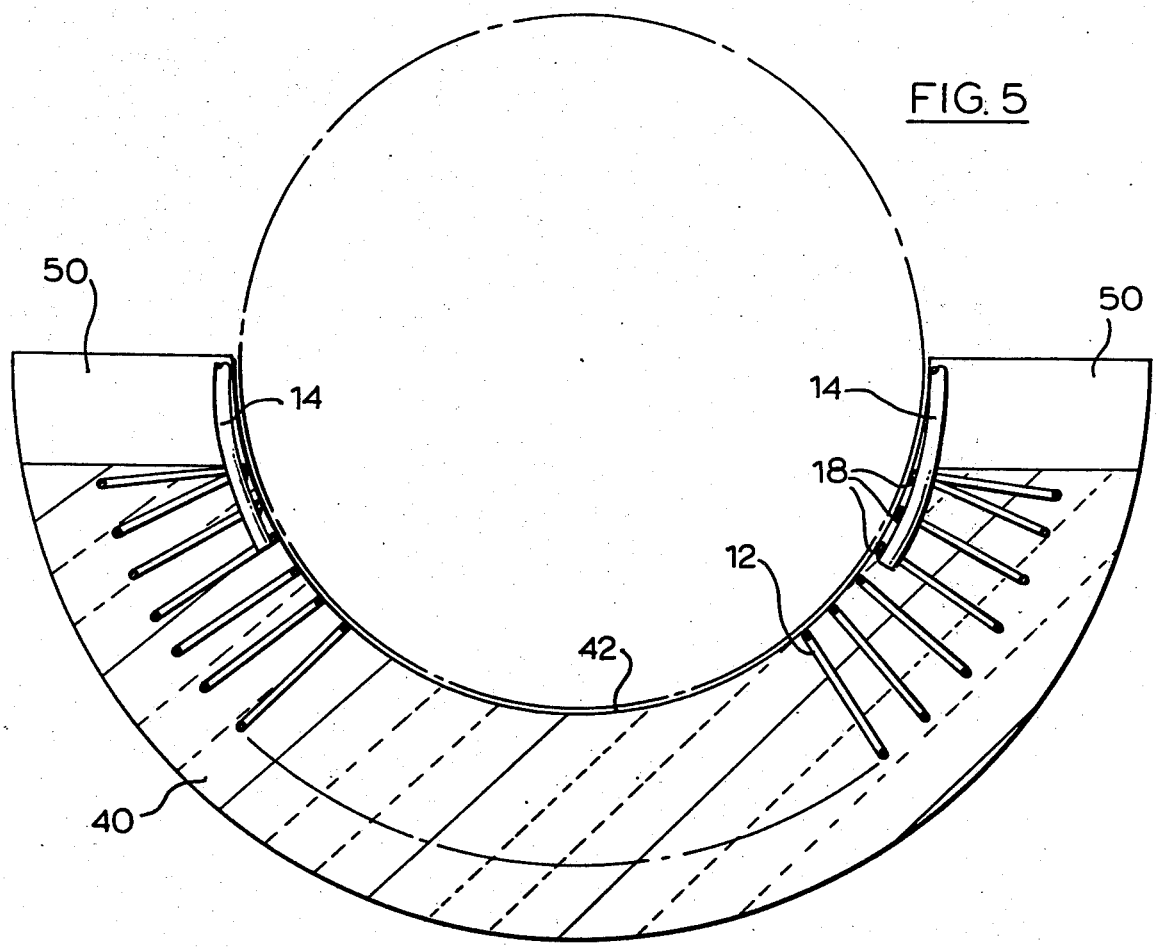
FIG. 5 is a sectional end view of a precast reinforced insulating member according to an embodiment of the present invention.

As shown in FIG. 5 of the drawings, the eye members 14 are arranged to extend in a plane adjacent to the plane of the concave inner surface 42 of the body of insulating material 40. This arrangement ensures that the eye members 14 will be located in a closely adjacent face-to-face relationship with the pipe 54 in use so as to be easily welded to the pipe when the weight of the body of insulating material is transmitted to the pipe 54 through the eyes 14. As previously indicated, the eyes 14 are welded to a plurality of turns of the coil spring 12, as shown at 18 so that the load transfer is distributed over a substantial length of the coil spring member 12.

From the foregoing, it will be apparent that the present invention provides a simple and inexpensive precast reinforced insulating member and a method of manufacturing same. The reinforcement is distributed through a substantial thickness of the body of insulating material by reason of the fact that the reinforcing member is in the form of a coil spring. The spring is secured in the mould in which the insulating material is cast by the use of simple mounting pins. The reinforcing coil is secured with respect to the furnace pipe by means of weldable lugs secured at opposite ends of the coil which are shaped and proportioned to be easily welded to the furnace pipe in use.

From the foregoing, it will be apparent that the present invention combines the advantages of a coil spring type of structural reinforcement and the advantages of a precast structure by modifying the coil spring reinforcement so that it may be radily welded directly to a furnace pipe in use to support the precast body of insulated material on the pipe.

Various modifications of the present invention will be apparent to those skilled in the art without departing from the scope of the invention. For example, the eye-bolt members 14 may be replaced by an alternative form of weldable lug, such as a flat strap of stainless steel material. It will also be apparent that more than two reinforcing coils may be located in any one length of reinforced insulating material.

In a further modification of the present invention, the method of producing the precast members may be modified such that a plurality of units are produced by a single mould in a "gang" system of casting.

When the precast reinforced insulating members of the present invention are used to insulate skid pipes, it will be understood that the insulating body will be located only on the lower portion of the pipe with the upper surface thereof being insulated by means of an additional insulating material applied in situ.

These and other variations and modifications of the present invention will be apparent to those skilled in the art without departing from the scope of the invention.

The embodiments of the invention in which an exclusive privilege or property is claimed are defined as follows:

1. A precast reinforced insulating member for use as a covering for a furnace pipe comprising:
   (a) a body of insulating material having an arcuate shaped inner surface adapted to extend in intimate contact with the surface of a furnace tube in use, an outer surface, a pair of transverse side faces extending from the inner arcuate surface to the outer surface and longitudinally of the body, and a pair of oppositely disposed end faces;
   (b) a plurality of resiliently deformable coil spring members, each coil spring member having a pair of oppositely disposed ends and a convoluted body extending therebetween, each coil spring member extending circumferentially of said body with the inner periphery of each turn of its convoluted body located at said inner surface, each coil spring member having a diameter such that its outer periphery projects a substantial distance into said body of insulating material, each coil spring member being resiliently longitudinally elongated to space adjacent turns thereof from one another to facilitate the passage of fluid insulating material therebetween during casting, the resilient elongation loading the coil spring member so that it is retained in its regular location when changing the mold during precasting,
   (c) passage means opening through said body between said inner arcuate surface and said outer surface thereof adjacent each end of each reinforcing coil spring member;
   (d) weldable lug means secured to each end of each reinforcing coil spring member and projecting into each passage means in a plane disposed adjacent to and substantially parallel to said inner arcuate surface whereby a substantial portion of each weldable lug means is disposed in weldable proximity to a furnace pipe and is accessible through said passage means when the insulating member is operably located about a furnace pipe in use.

2. A precast reinforcing insulating member as claimed in claim 1 wherein said weldable lug means has an inner end portion projecting inwardly of the end of the reinforcing coil spring member to underlie at least two adjacent turns of the coil which are spaced from one another, said two adjacent turns being welded to said underlying portion of said lug whereby the load carried by the weldable lug is distributed to at least two turns of the reinforcing coil spring member in use.

3. A precast reinforcing insulating member as claimed in claim 1 wherein said weldable lug means consists of an eye-bolt member having a leg portion thereof connected to the coil spring member and a head portion thereof projecting outwardly from the coil spring member into the passage means, the head portion extending in a plane substantially parallel to said inner surface so as to be disposed in a face-to-face relationship with the outer surface of a furnace pipe in use, the eye of said bolt opening through said head at right angles to said plane so that the head is weldable to a furnace pipe through said eye.

4. A precast reinforcing insulating member as claimed in claim 1 wherein said reinforcing coil spring members are formed from stainless steel coil springs.

5. A precast reinforcing insulating member as claimed in claim 1 wherein said weldable lug means is formed from a metal of a heavier gauge than that of the reinforcing coil members so as to be more readily weldable to the furnace pipe in use.

* * * * *